United States Patent
Chuang et al.

(10) Patent No.: US 11,861,702 B2
(45) Date of Patent: Jan. 2, 2024

(54) METHOD AND APPARATUS FOR RENEWABLE ENERGY ALLOCATION BASED ON REINFORCEMENT LEARNING

(71) Applicant: National Tsing Hua University, Hsinchu (TW)

(72) Inventors: Yu-Chieh Chuang, Hsinchu (TW); Wei-Yu Chiu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 487 days.

(21) Appl. No.: 17/241,009

(22) Filed: Apr. 26, 2021

(65) Prior Publication Data
US 2022/0230243 A1 Jul. 21, 2022

(30) Foreign Application Priority Data
Jan. 20, 2021 (TW) ................................. 110102148

(51) Int. Cl.
*G06Q 40/04* (2012.01)
*G06N 3/08* (2023.01)
*G06N 3/04* (2023.01)

(52) U.S. Cl.
CPC ............... *G06Q 40/04* (2013.01); *G06N 3/04* (2013.01); *G06N 3/08* (2013.01)

(58) Field of Classification Search
CPC ............ G06Q 40/04; G06N 3/04; G06N 3/08; G06N 20/00
See application file for complete search history.

(56) References Cited

U.S. PATENT DOCUMENTS

| 2009/0200988 A1 | 8/2009 | Bridges et al. |
| 2015/0242946 A1 | 8/2015 | Powell et al. |
| 2021/0021128 A1* | 1/2021 | Subramanian ......... G06Q 50/06 |

FOREIGN PATENT DOCUMENTS

| CN | 106651214 | 5/2017 |
| CN | 106651214 A * | 5/2017 |
| TW | 201610901 | 3/2016 |

OTHER PUBLICATIONS

Peters, M., Ketter, W., Saar-Tsechansky, M. et al. A reinforcement learning approach to autonomous decision-making in smart electricity markets. published in Mach Learn 92, 5-39 (2013), [online], retrieved on Oct. 11, 2023 from <https://doi.org/10.1007/s10994-013-5340-0> (Year: 2013).*

(Continued)

*Primary Examiner* — Charles Cai
(74) *Attorney, Agent, or Firm* — JCIPRNET

(57) ABSTRACT

The disclosure provides a method and an apparatus for renewable-energy allocation based on reinforcement learning for an energy aggregator having an energy storage system (ESS) to coordinate renewable-energy allocation between energy suppliers and energy demanders. In the method, historical power-generation data of each supplier is collected and adapted to generate a renewable-energy index representing uncertainty of renewable energy. Multiple market indexes related to renewable-energy market dynamics are collected and integrated with the renewable-energy index and electricity information of the ESS to generate multiple states of a Markov decision process. The states are inputted to a reinforcement learning model to determine a price for the suppliers and the demanders. According to a supply amount and a demand amount proposed by the suppliers and the demanders in response to the price, the ESS coordinates the supply and demand of the renewable energy, and the reinforcement learning model is updated.

20 Claims, 5 Drawing Sheets

(56) References Cited

OTHER PUBLICATIONS

Yu-Chieh Chuang et al., "Deep Reinforcement Learning Based Pricing Strategy of Aggregators Considering Renewable Energy", IEEE Transactions on Emerging Topics in Computational Intelligence, Sep. 21, 2021, pp. 1-10.

* cited by examiner

METHOD AND APPARATUS FOR RENEWABLE ENERGY ALLOCATION BASED ON REINFORCEMENT LEARNING

CROSS-REFERENCE TO RELATED APPLICATION

This application claims the priority benefit of Taiwan application serial no. 110102148, filed on Jan. 20, 2021. The entirety of the above-mentioned patent application is hereby incorporated by reference herein and made a part of this specification.

BACKGROUND

Technical Field

The disclosure relates to a method and an apparatus of reinforcement learning, particularly to a method and an apparatus for renewable-energy allocation based on reinforcement learning.

Description of Related Art

In recent years, to reduce our dependence on fossil fuels and to response to the rise of environmental awareness, the renewable energy of the total generation of power has increased. Since the amount of electricity generated by renewable energy changes based on the environment, this uncertainty, such as intermittence, of renewable energy result in sharp fluctuations in market price. Currently, there is a liberalized electricity trade structure, in which energy aggregators coordinate the allocation of power supply and its price between energy consumers and energy generation industries. The energy aggregator, who is on behalf of the energy consumers, negotiates with the energy generation industries to coordinate the supply-demand allocation of renewable energy between the energy supplier and the energy demander.

Conventionally, game theory, genetic algorithm, or fuzzy logic is usually adopted to allocate the supply and demand of renewable energy. However, these algorithms become less suitable in today's environment due to their design. To solve this problem, in recent years, mainstream researchers come to adopt reinforcement learning algorithms to determine the pricing strategy. Still, this method still spotlights fossil fuels and does not take into account the uncertainty, such as intermittence, of renewable energy. In addition, energy aggregators of today often use the attached energy storage system (ESS) to mitigate to a certain extent the energy loss and the price loss caused by overbought or oversold. However, this method needs to take additional consideration of the charge and discharge controls of the ESS (where the upper and lower bounds are not fixed values), which increases the overall complexity of the system.

SUMMARY

The disclosure provides a method and an apparatus for renewable-energy allocation based on reinforcement learning, which are adapted to reduce the intermittent uncertainty of renewable energy and accelerate the learning speed of reinforcement learning.

The disclosure provides a method for renewable-energy allocation based on reinforcement learning, and the method is adapted for an energy aggregator having an energy storage system (ESS) to coordinate renewable-energy allocation between multiple energy suppliers and multiple energy demanders. This method includes the following steps: collecting historical power-generation data of each energy supplier to generate a renewable-energy index representing uncertainty of renewable energy; collecting at least one market index related to renewable-energy market dynamics and integrating the market index with the renewable-energy index and electricity information of the ESS into multiple states of a Markov decision process; inputting these states to a reinforcement learning model, so as to determine a price bid for each of the energy suppliers and the energy demanders through computation of the reinforcement learning model; and according to a supply amount and a demand amount proposed by the energy suppliers and the energy demanders in response to the price bids, adjusting the ESS to coordinate the supply and demand of the renewable energy between the energy suppliers and the energy demanders, and updating the reinforcement learning model.

The disclosure provides an apparatus for renewable-energy allocation based on reinforcement learning, and the apparatus includes an ESS, a connection device, a storage device, and a processor. The ESS is configured to store renewable energy. The connection device is configured to connect an energy supplier and an energy demander with each other. The storage device is configured to store computer programs. The processor is coupled to the ESS, the connection device, and the storage device, and is configured to load and execute the computer programs so as to: collect historical power-generation data of each energy supplier to generate a renewable-energy index representing uncertainty of renewable energy; collect at least one market index related to renewable-energy market dynamics and integrate the market index with the renewable-energy index and the electricity information of ESS into multiple states of a Markov decision process; input these states to the reinforcement learning model to determine price for the energy supplier and the energy demander through computation of the reinforcement learning model; and according to a supply amount and a demand amount proposed by the energy supplier and the energy demander in response to the price, adjust the ESS to coordinate the supply and demand of renewable energy between the energy supplier and the energy demander, and update the reinforcement learning model.

Based on the above, the apparatus and the method for renewable-energy allocation based on reinforcement learning of the present disclosure process and group the historical power-generation data of renewable energy, and use the indexes obtained through processing for the state design of the reinforcement learning algorithm, thereby integrating the reinforcement learning model and the charging-and-discharging strategy of the ESS to accelerate the learning speed.

In order to make the above features of the present disclosure more comprehensible, the following embodiments are described in detail with the drawings attached.

DESCRIPTION OF THE EMBODIMENTS

The embodiments of the present disclosure extract features of power-generation data of renewable energy within a certain period of time by using a statistical method, and obtain the degree of uncertainty of the current acquired energy by grouping the feature data and assigning weights to each group. In addition, the embodiments of the present disclosure control the charging and discharging of an energy storage system (ESS) by designing specific rules, and coordinate the purchase and sale of the renewable energy. Finally, the two methods above are integrated into a reinforcement learning algorithm, such as deep deterministic policy gradient, to improve the learning speed of the reinforcement learning algorithm.

Figure 1:
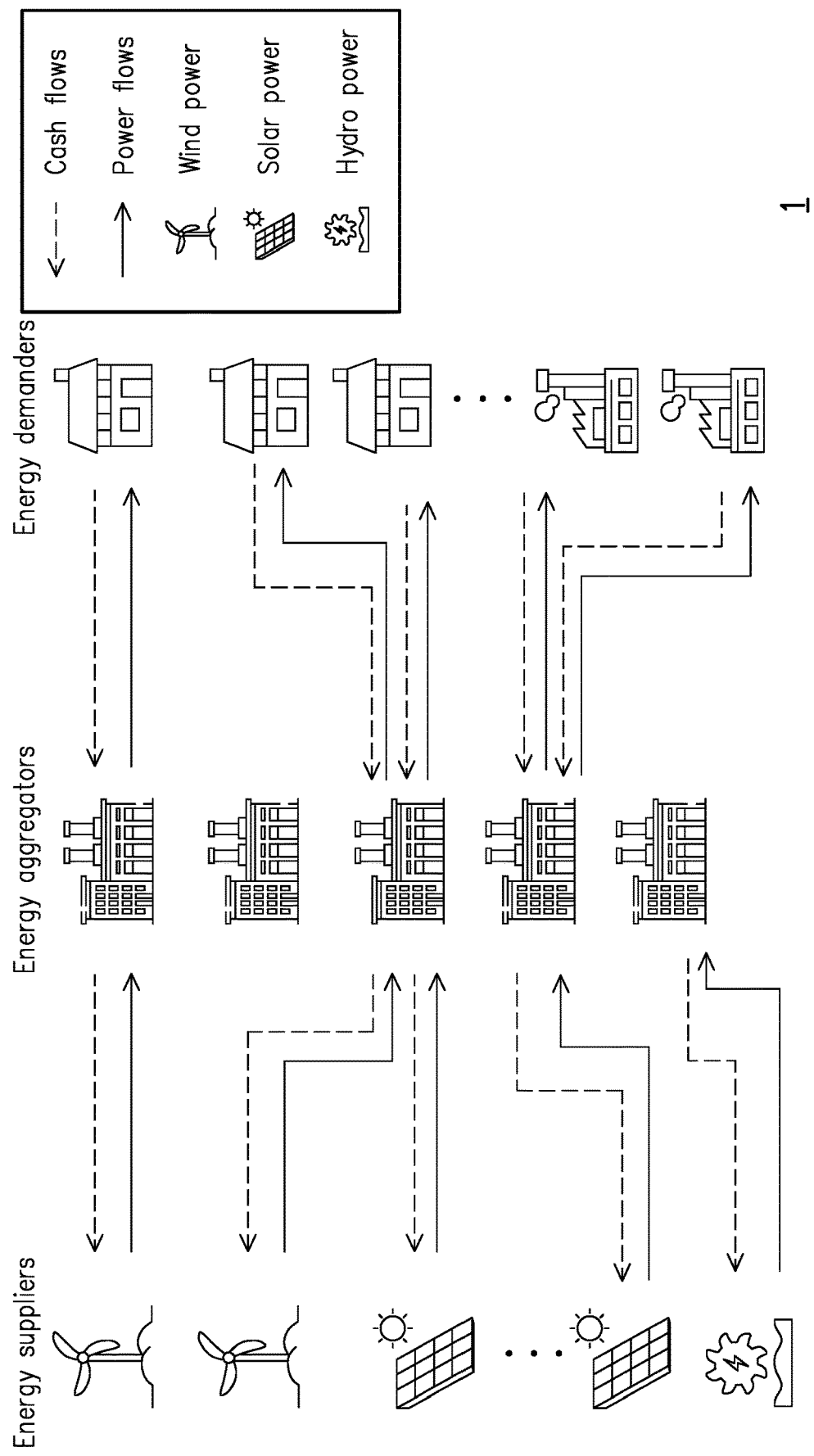
FIG. 1 is a structural diagram of a renewable-energy zonal grid according to an embodiment of the present disclosure.

FIG. 1 is a structural diagram of a renewable-energy zonal grid according to an embodiment of the present disclosure. In FIG. 1, there are multiple energy suppliers, which are also known as producers, in a zonal grid 1 of renewable energy. These may be, for example, citizen power plants, household solar generators, and small hydropower plants that supply renewable energy. There are also multiple competing energy aggregators in the zonal grid 1, which, for example, act as energy aggregators that announce electricity prices regularly to attract the producers to sell the renewable energy. There are also multiple energy demanders in the zonal grid 1, which are also called consumers. They are, for example, household consumers or factories, who propose their demand of electricity to the energy aggregators. And the energy aggregators, for example, evaluate the uncertainty of the renewable energy provided by the producers, and integrate them with the current electricity stored in their own ESSs and other market features into multiple states in a Markov decision process, which are input to a reinforcement learning model, and through computation of the neural network and other learning model, the price bids for the producers and the consumers are determined, thereby optimizing the interests of both parties as well as the aggregators themselves.

Figure 2:
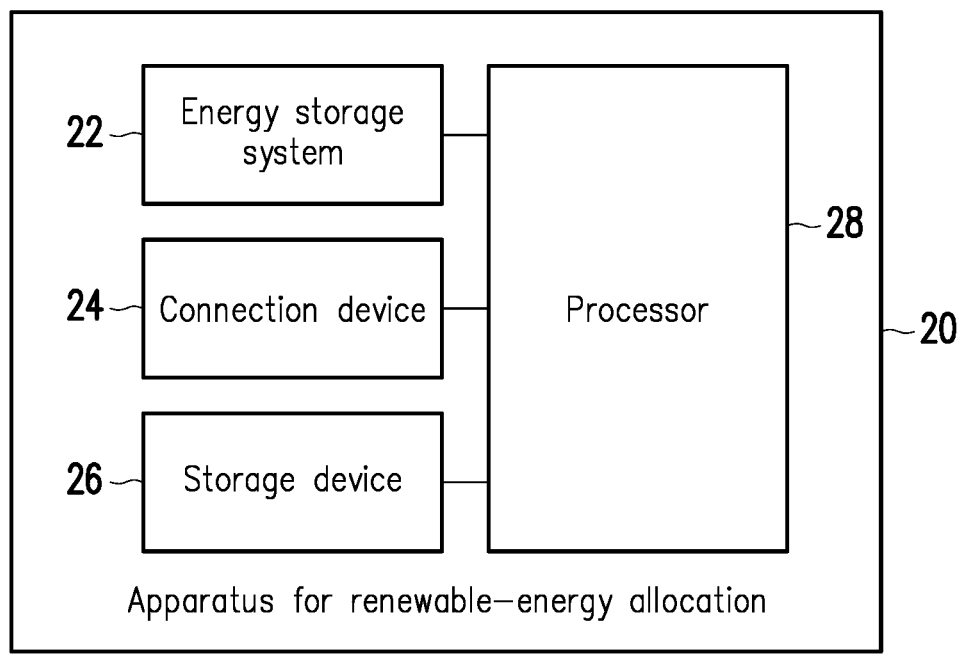
FIG. 2 is a block diagram of an apparatus for renewable-energy allocation based on reinforcement learning according to an embodiment of the present disclosure.

FIG. 2 is a block diagram of an apparatus for renewable-energy allocation based on reinforcement learning according to an embodiment of the present disclosure. Please refer to FIG. 1 and FIG. 2 at the same time. An apparatus for renewable-energy allocation 20 of the embodiment of the present disclosure, for example, is adapted as the energy aggregator in FIG. 1, and may coordinate the supply-demand allocation of the renewable energy between the energy suppliers and the energy demanders. In some embodiments, the apparatus for renewable-energy allocation 20 is, for example, a computer apparatus, such as a file server, a database server, an application server, a workstation, or a personal computer with computing capabilities, which includes an ESS 22, a connection device 24, a storage device 26, and a processor 28. The functions of these components are described as follows.

The ESS 22 includes, for example, a high-efficiency energy storage battery, such as lithium-iron batteries, all-iron flow batteries, solid-state lithium-ion batteries, and zinc-nickel batteries, which, for example, combines the battery management system (BMS), temperature control system, background management system, and other technologies, to play the role of reconciliation in the renewable energy grid to provide real-time power buffering, absorption, and compensation, thereby improving the power quality of the grid, increasing the power reserve capacity, and/or stabilizing the intermittent output of the renewable energy, so that the supply and load of the grid maintains a stable balance.

The connection device 24 is, for example, any wired or wireless interface device capable of connecting the energy suppliers and the energy demanders. For wired methods, the connection device 24 may be a universal serial bus (USB), a RS232, a universal asynchronous receiver/transmitter (UART), an internal integrated circuit (I2C), serial peripheral interface (SPI), display port, thunderbolt, or local area network (LAN) interface, but the disclosure is not limited thereto. For wireless methods, the connection device 24 may support wireless fidelity (Wi-Fi), RFID, Bluetooth, infrared, near-field communication (NFC), device-to-device (D2D) communication, and/or other communication protocol devices, and the disclosure is not limited thereto. In some embodiments, the connection device 24 may also include a network interface card that supports Ethernet or wireless network standards, such as 802.11g, 802.11n, 802.11ac, etc., so that the apparatus for renewable-energy allocation 20 can be connected to the energy suppliers and the energy demanders through the Internet, so as to upload the price bids and receive the supply amount and the demand amount proposed by the energy suppliers and the energy demanders in response to the price bids.

The storage device 26 is, for example, any type of fixed or removable random access memory (RAM), read-only memory (ROM), flash memory, hard disk, similar components, or a combination thereof, and is configured to store computer programs executable by the processor 28.

The processor 28 is, for example, a central processing unit (CPU), other programmable general-purpose or special-purpose microprocessor, microcontroller, digital signal processor (DSP), programmable controller, application specific integrated circuit (ASIC), programmable logic device (LD), other similar devices, or a combination thereof, and the present disclosure is not limited thereto. In this embodiment, the processor 28 loads a computer program from the storage device 26 to execute the method for renewable-energy allocation based on reinforcement learning of the embodiment of the present disclosure.

The method for renewable-energy allocation of the embodiment of the present disclosure adopts, for example, a reinforcement learning algorithm. In this algorithm, an action of the energy aggregator may be defined as a price bid $p_{k,t}^{P}$ of the energy suppliers and a price bid $p_{k,t}^{C}$ of the energy demanders, which is shown as follows:

$$a_{k,t} = \begin{bmatrix} p_{k,t}^{P} \\ p_{k,t}^{C} \end{bmatrix}$$

Among the above formula, $p^{min} \leq p_{k,t}^{P} \leq p^{max}$, and $p^{min} \leq p_{k,t}^{C} \leq p^{max}$, where $p^{min}$ and $p^{max}$ are the lower limit and upper limit of the price bids, and its value may be defined suitably based on the market environment, to which the present disclosure is not limited.

The states observed by the energy aggregator may include but is not limited to: the electricity information of the ESS 22, renewable-energy index, and market indexes, and the states are defined as follows:

$S_{k,t} = [\zeta_{t-1}, \zeta_t, \xi_{k,t-1}, \xi_{k,t}, p_{k,t-1}^C, p_{k,t-1}^P, e_{k,t-1}, p_{k,t-1}^{C_{oppo}}, p_{k,t-1}^{P_{oppo}}, H_{k,t-1}^{V_{high}}, H_{k,t-1}^{V_{low}}]$ Among the above formula, $\zeta_t$ is the market rationality index for determining whether a market is rational. In some embodiments, the processor 28, for example, determines whether a minimum value of a price bid $p_{k,t-1}^C$ for the energy demanders is greater than or equal to a maximum value of a price bid $p_{k,t-1}^P$ for the energy supplier, and determines the market rationality index $\zeta_t$ according to the determination result, and the definition of the market rationality index $\zeta_t$ is as follows:

$$\zeta_t = \begin{cases} 1, & \text{if } \min_{\forall k \in K} p_{k,t-1}^C \geq \max_{\forall k \in K} p_{k,t-1}^P \\ 0, & \text{if } \min_{\forall k \in K} p_{k,t-1}^C < \max_{\forall k \in K} p_{k,t-1}^P \end{cases}$$

In addition, $\xi_{k,t}$ is a supply-demand balance index of the energy aggregator itself. In some embodiments, the processor 28, for example, determines whether the total supply amount $\Psi_{k,t-1}^P$ of renewable energy supplied by the energy suppliers is greater than the total demand $\Psi_{k,t-1}^C$ of renewable energy demanded by the energy demander, so as to determine the supply-demand balance index $\xi_{k,t}$ according to the determination result, and the definition of the supply-demand balance index $\xi_{k,t}$ is as follows:

$$\xi_{k,t} = \begin{cases} 1, & \text{if } \frac{\psi_{k,t-1}^P}{\psi_{k,t-1}^C} > 1 \\ 0, & \text{if } \frac{\psi_{k,t-1}^P}{\psi_{k,t-1}^C} = 1 \\ -1, & \text{if } \frac{\psi_{k,t-1}^P}{\psi_{k,t-1}^C} < 1 \end{cases}$$

The above state also includes the price bids $p_{k,t-1}^{C_{oppo}}$ and $p_{k,t-1}^{P_{oppo}}$ of other competing aggregators for the energy demanders and the energy suppliers, which are defined as follows:

$p_{k,t-1}^{C_{oppo}} = [p_{1,t}^C, \ldots, p_{k-1,t}^C, P_{k+1,t}^C, \ldots, p_{K,t}^C]$
$p_{k,t-1}^{P_{oppo}} = [p_{1,t}^P, \ldots, p_{k-1,t}^P, P_{k+1,t}^P, \ldots, p_{K,t}^P]$ In addition, the above state may also include other elements, such as the current electricity $e_{k,t-1}$ of the ESS 22, and the renewable-energy indexes $H_{k,t-1}^{V_{high}}$ and $H_{k,t-1}^{V_{low}}$. Their definitions and computation method are described in detail later.

Figure 3:
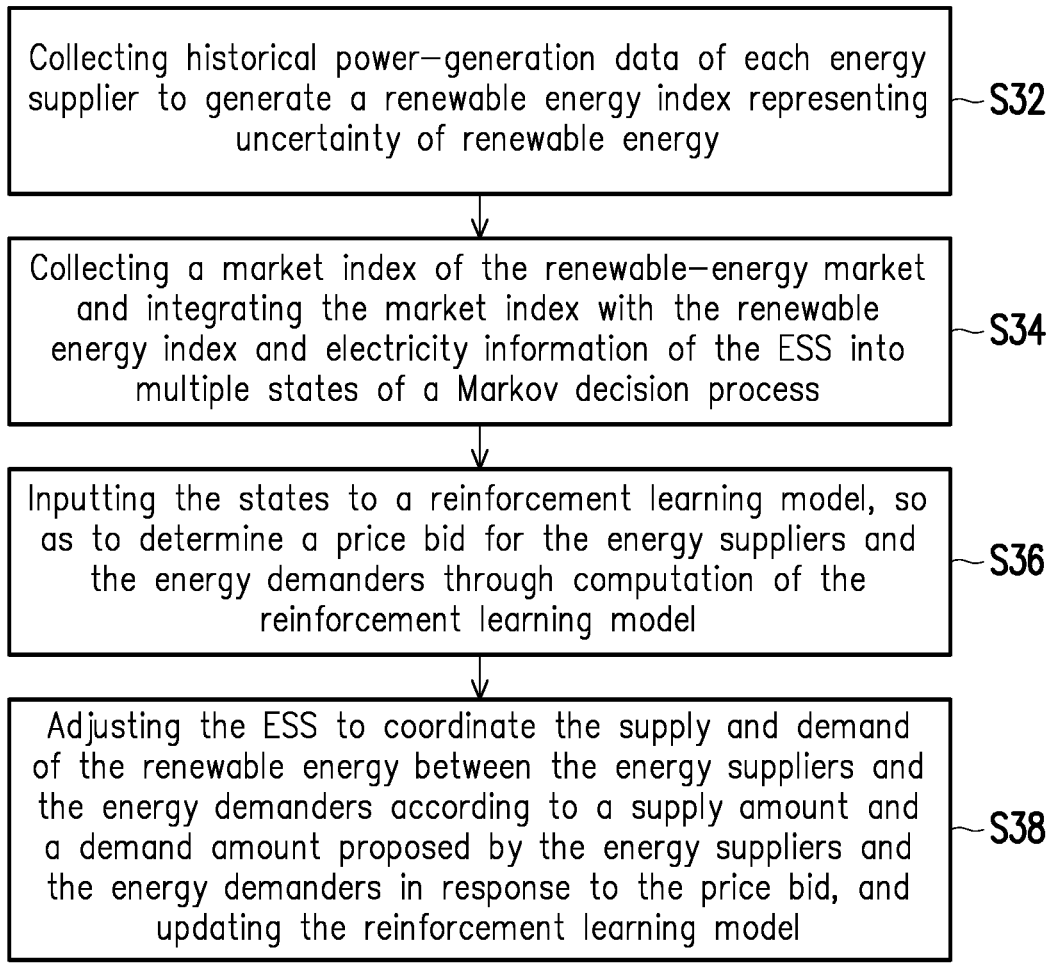
FIG. 3 is a flowchart of a method for renewable-energy allocation based on reinforcement learning according to an embodiment of the present disclosure.
Figure 4:
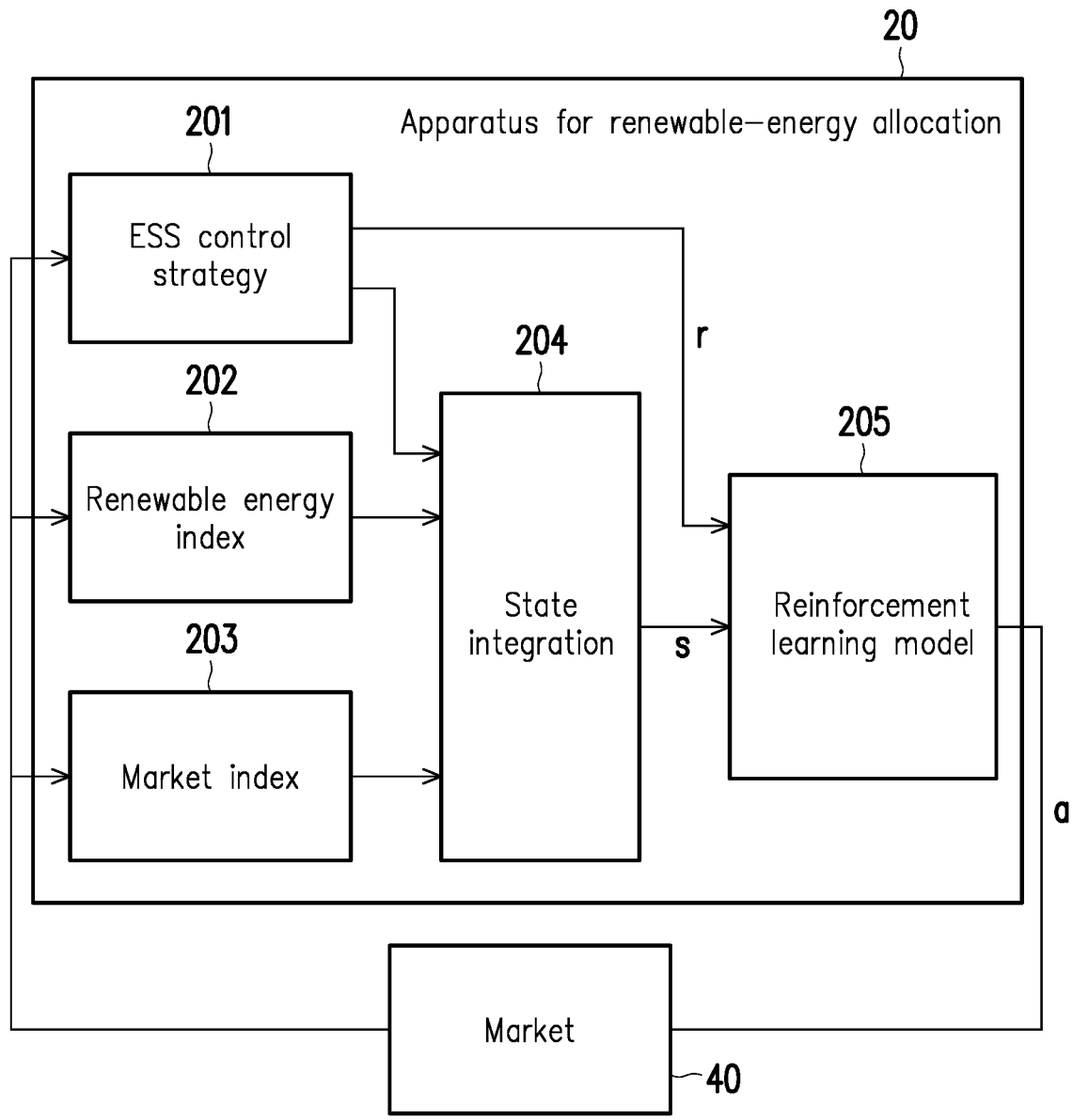
FIG. 4 is a schematic diagram of a method for renewable-energy allocation based on reinforcement learning according to an embodiment of the present disclosure.

FIG. 3 is a flowchart of a method for renewable-energy allocation based on reinforcement learning according to an embodiment of the present disclosure. FIG. 4 is a schematic diagram of a method for renewable-energy allocation based on reinforcement learning according to an embodiment of the present disclosure. Please refer to FIG. 2, FIG. 3, and FIG. 4 at the same time. The method of this embodiment is applicable to the apparatus for renewable-energy allocation 20 mentioned above, and may be divided into stages of data collection, state integration, and model update. The following description recounts in detail the steps of the method for renewable-energy allocation of this embodiment with various components of the apparatus for renewable-energy allocation 20.

In the stage of data collection, the apparatus for renewable-energy allocation 20 serves as a target aggregator to observe, for example, its own state, market state, and competitors' price bids to obtain market indexes of the renewable-energy market.

Specifically, in step S32, the processor 28, for example, connects each of the energy suppliers by the connection device 22 so as to collect historical power-generation data, and use the same to generate a renewable-energy index representing uncertainty of renewable energy (for example, in FIG. 4, data collected from a market 40 is used to generate renewable-energy index 202).

In some embodiments, the processor 28 adopts the historical power-generation data to construct a feature matrix and executes a clustering algorithm to divide multiple elements in the feature matrix into multiple groups, and calculates the distance between the center of each group and the zero point, thereby generating the renewable-energy index. In some embodiments, the processor 28 further counts the number of the energy suppliers that select the energy aggregator in each group, and multiplies the number of each group by a corresponding weight to generate the renewable-energy index.

Figure 5:
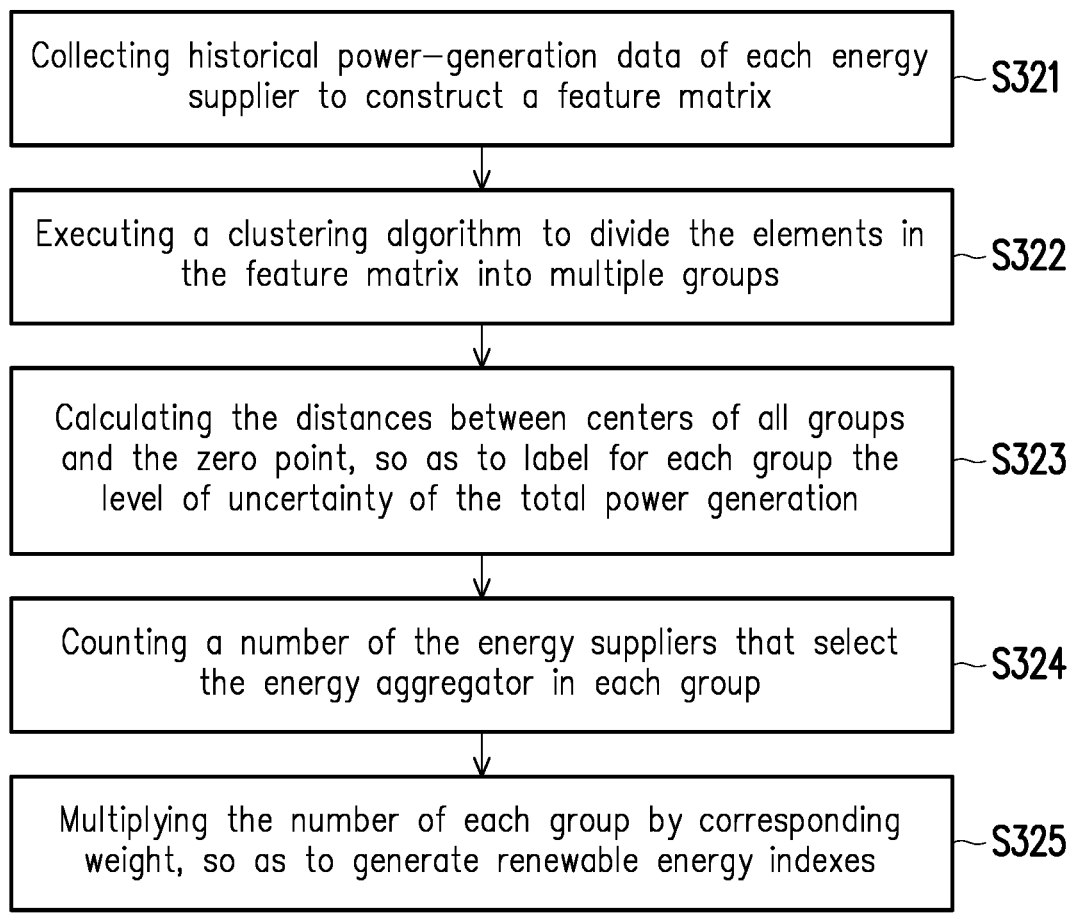
FIG. 5 is a flowchart of a method for generating a renewable-energy index based on reinforcement learning according to an embodiment of the present disclosure.

Specifically, FIG. 5 is a flowchart of a method for generating a renewable-energy index based on reinforcement learning according to an embodiment of the present disclosure. Please refer to FIG. 2 and FIG. 5 at the same time. This embodiment illustrates the process of step S32 of FIG. 3 in detail.

In step S321, the processor 28, for example, collects the historical power-generation data $E_t^P$ of all energy suppliers within a certain period of time, and constructs feat a feature matrix $E_t^{P,feat}$ with the historical power-generation data, and they have the following definitions:

$$E_t^P = \begin{bmatrix} \vec{e}_{1,t}^P \\ \vec{e}_{2,t}^P \\ \vdots \\ \vec{e}_{M,t}^P \end{bmatrix} = \begin{bmatrix} e_{1,t-1}^P & e_{1,t-2}^P & \cdots & e_{1,t-T_h}^P \\ e_{2,t-1}^P & e_{2,t-2}^P & \cdots & e_{2,t-T_h}^P \\ \vdots & \vdots & \ddots & \vdots \\ e_{M,t-1}^P & e_{M,t-2}^P & \cdots & e_{M,t-T_h}^P \end{bmatrix}$$

$$E_t^{P,feat} = \begin{bmatrix} \vec{e}_{1,t}^{P,feat} \\ \vec{e}_{2,t}^{P,feat} \\ \vdots \\ \vec{e}_{M,t}^{P,feat} \end{bmatrix}$$

Among the above formulas, t is the current moment, $T_h$ is the duration of the historical data, and M is the total number of the energy suppliers.

For this feature matrix $E_t^P$, in step S322, the processor 28 executes a clustering algorithm (a clustering method), for example, to divide the elements in the feature matrix into multiple groups. For example, the processor 28 may adopt, but not limited to, the k-means algorithm to divide the elements in the feature matrix into 4 groups, as shown below:

$G_t^1, G_t^2, \ldots, G_t^4 \leftarrow \text{CLUSTER}(E_t^{P,feat})$

Among the above formula, $G_t^n$ is the n-th group at the current moment.

In step S323, the processor 28 labels for each group the level of intermittent uncertainty of the total amount of its recent power generation, for example, by calculating the distances between the centers of all groups and the zero point, as shown below: $G_t^I, G_t^{II}, \ldots, G_t^{IV} \leftarrow \text{LABEL}(G_1^1, G_t^2, \ldots, G_t^4)$ In some embodiments, the processor 28 directly adopts the aforementioned uncertainties $G_t^I, G_t^{II}, G_t^{III},$ and $G_t^{IV}$ as the renewable-energy index for the reinforcement learning algorithm.

In step S324 of this embodiment, the processor 28, for example, counts the number of the energy suppliers that select the energy aggregator in each group at the moment, and multiplies in step S325 the number of each group by different weights, thereby using the obtained indexes as the renewable-energy indexes. In this way, the dimensionality occupied by the renewable-energy index in the defined state is reduced, thereby reducing the amount of computation for the subsequent execution of the reinforcement learning algorithm. The computation formulas for the above renewable-energy indexes $H_t^1$ and $H_t^2$ are as follows:

$H_t^1 \leftarrow \alpha * \text{num}(G_t^I) + (1-\alpha) * \text{num}(G_t^{II})$
$H_t^2 \leftarrow \beta * \text{num}(G_t^{III}) + (1-\beta) * \text{num}(G_t^{IV})$ Among the above formulas, $0 \leq \alpha \leq 1$ and $0 \leq \beta \leq 1$.

Then, it is moved on to the stage of state integration. In this stage, the apparatus for renewable-energy allocation 20 serves as the target aggregator, where the processor 28 integrates the observed market indexes mentioned above, the calculated renewable-energy index, and the electricity information of the ESS 22 itself into multiple states of the Markov decision process, and inputs the states to the reinforcement learning model, so as to determine price bids $p_{k,t}^P$ and $p_{k,t}^C$ for the energy suppliers and the energy demanders through computation of the reinforcement learning model.

And in step S34 of FIG. 4, for example, the apparatus for renewable-energy allocation 20 may integrate, for example, in the state integration 204 the electricity information output by an ESS control strategy 201, the calculated renewable-energy index 202, and the observed market index 203 into a state S of the Markov decision process, and then in step S36, inputs the state S to an reinforcement learning model 205, which adopts an arbitrary neural network algorithm, such as the deep deterministic policy gradient algorithm, to calculate and output the price bids $p_{k,t}^P$ and $p_{k,t}^C$. The price bids $p_{k,t}^P$ and $p_{k,t}^C$ are provided as an action a for the energy suppliers and the energy demanders on the market 40. The energy suppliers and the energy demanders respond to the price bids and propose the supply amount of renewable energy they can provide or the demand amount for renewable energy they need.

Finally, it enters the stage of model update. In this stage, the apparatus for renewable-energy allocation 20 that serves as the target aggregator learns the selection (that is, the supply amount and demand amount aforementioned) of the energy suppliers and the energy demanders, and thereafter obtain the final supply amount and demand amount through, for example, the control of the ESS 22. After adjusting the ESS 22, the apparatus for renewable-energy allocation 20 learns the reward of the price bids and obtains a new market observation to update the parameters of the reinforcement learning model (for example, in FIG. 4, the ESS control strategy 201 outputs the reward r to the reinforcement learning model 205 to update the parameters of the reinforcement learning model 205).

Specifically, in step S38, the processor 28 adjusts the ESS 22 to coordinate the supply and demand of renewable energy between the energy suppliers and the energy demanders according to the supply amount and the demand amount proposed by the energy suppliers and the energy demanders in response to the price bids, and updates the reinforcement learning model.

In some embodiments, the processor 28 determines whether the total supply amount of renewable energy supplied by the energy supplier is greater than or equal to the total demand of renewable energy demanded by the energy demander. Among the above, when the total supply amount is greater than or equal to the total demand amount, the processor 28 selects the minimum value from the difference between the total supply amount and the total demand amount and the difference between the maximum energy storage capacity and the currently stored electricity of the ESS 22, so as to determine the supply amount of the energy suppliers and the demand amount of the energy demanders; when the total supply amount is less than the total demand amount, the minimum value is selected from the difference between the total demand amount and the total supply amount and the difference between the currently stored electricity and the minimum energy storage capacity of the ESS 22, so as to determine the supply amount of the energy suppliers and the demand amount of the energy demanders. Their formulas are described as follows:

When the total supply amount $\Psi_{k,t}^P$ is greater than or equal to the total demand amount $\Psi_{k,t}^C$, the control $u_{k,t}$ of the ESS 22 is as follows:

$$u_{k,t} = \min(\Psi_{k,t}^P - \Psi_{k,t}^C, e^{max} - e_{k,t})$$

When the total supply $\Psi_{k,t}^P$ is less than the total demand $\Psi_{k,t}^C$, the control $u_{k,t}$ of the ESS 22 is as follows:

$$u_{k,t} = \min(\Psi_{k,t}^C - \Psi_{k,t}^P, e_{k,t} - e^{min})$$

Among the above formulas, $e^{max}$ and $e^{min}$ are respectively the maximum energy storage capacity and minimum energy storage capacity of the ESS 22.

In some embodiments, the processor 28 calculates the reward for the determined price bids according to the adjustment made to the ESS 22, and then collects and integrates the market indexes of the energy market in response to the price bids with the renewable-energy index and the electricity information of the ESS 22 into the states, and updates the reinforcement learning model using the states and the reward.

The processor 28, for example, takes a profit obtained by deducting a loss produced by adopting the price bids from an income obtained by adopting the price bids as a reward r, and its formula is as follows:

$$r_{k,t+1} = \begin{cases} p_{k,t}^C(\psi_{k,t}^C + u_{k,t}) - p_{k,t}^P \psi_{k,t}^P - \Phi_{k,t} & \text{if } \psi_{k,t}^C \geq \psi_{k,t}^P \\ p_{k,t}^C \psi_{k,t}^C - p_{k,t}^P \psi_{k,t}^P - \Phi_{k,t} & \text{if } \psi_{k,t}^C < \psi_{k,t}^P \end{cases}$$

Among the above formula, a loss function $\Psi$ is follows:

$$\Phi_{k,t} = \begin{cases} (\psi_{k,t}^C - \psi_{k,t}^P - u_{k,t})\phi_- & \text{if } \psi_{k,t}^C \geq \psi_{k,t}^P \\ (\psi_{k,t}^C - \psi_{k,t}^P - u_{k,t})\phi_+ & \text{if } \psi_{k,t}^C < \psi_{k,t}^P \end{cases}$$

Among the above formula, $\phi_-$ and $\phi_+$ are the penalty prices respectively for undersupply and oversupply.

In some embodiments, the processor 28 adopts reinforcement learning to update the parameters in the reinforcement learning model V(s):

$$V(s) \leftarrow V(s) + \alpha[r(s) + \gamma V(s') - V(s)]$$

Among the above formula, r(s) is the reward, α is the learning rate, and γ is the discount factor.

Taking reinforcement learning (Q-Learning) as an example, the update formula is as follows:

$$Q(S,A) \leftarrow Q(S,A) + \alpha[r + \gamma \max_a Q(S',A) - Q(S,A)]$$

Among the above formula, Q(S,A) is the current learning value (i.e., Q value), Q(S',A) is the learning value of the next period of time, r is the reward, α is the learning rate, and γ is the discount factor.

Taking deep learning network (Deep Q-Network) as an example, the update formula is as follows:

$$L_i(\theta_i) = \mathbb{E}_{(s,a,r,s') \sim U(D)}[(r + \gamma \max_{a'} Q(s',a';\theta_{i-1}) - Q(s,a;\theta_i))^2]$$

Among the above formula, $L_i(\theta_i)$ is the loss function value, $\theta_i$ is the neural network parameter, $\mathbb{E}$ is the expected value of the cumulative cost, $Q(s, a; \theta_i)$ is the current learning value, $Q(s', a'; \theta_{i-1})$ is the learning value of the next period of time, r is the reward, α is the learning rate, and γ is the discount factor.

By repeating the above steps of data collection, state integration, and model update, a reinforcement learning model optimized for the market environment and the charging and discharging controls of the ESS may finally be obtained, and through this reinforcement learning model, the price bids may be calculated and the supply-demand allocation of renewable energy between the energy suppliers and the energy demanders is coordinated accordingly, thus optimizing the utilization of renewable energy and the profit of the energy aggregator.

To sum up, the apparatus and the method for renewable-energy allocation based on reinforcement learning according to the embodiments of the present disclosure integrate the statistical characteristics of renewable energy; by processing and grouping the historical power-generation data of renewable energy, and controlling the charge and discharge of the ESS based on specific rules, the control of the ESS transcends the framework of reinforcement learning and reduces the impact of the intermittent uncertainty of renewable energy on learning, thereby accelerating the speed of reinforcement learning and maximizing the total profit of the energy aggregator.

Although the disclosure has been described with reference to the above embodiments, it is apparent to one of ordinary skill in the art that modifications to the described embodiments may be made without departing from the spirit of the disclosure. Accordingly, the scope of the disclosure is defined by the attached claims.

What is claimed is:

1. A method for renewable-energy allocation based on reinforcement learning, adapted for an energy aggregator having an energy storage system to coordinate renewable-energy allocation between a plurality of energy suppliers and a plurality of energy demanders, the method comprising:
   collecting historical power-generation data of each of the energy suppliers, so as to generate a renewable-energy index representing uncertainty of renewable energy;
   collecting at least one market index related to renewable-energy market dynamics and integrating the at least one market index with the renewable-energy index and electricity information of the energy storage system into a plurality of states of a Markov decision process;
   inputting the states to a reinforcement learning model, so as to determine a price bid for each of the energy suppliers and the energy demanders through computation of the reinforcement learning model; and
   according to a supply amount and a demand amount proposed by the energy suppliers and the energy demanders in response to the price bids, adjusting the energy storage system to coordinate supply and demand of the renewable energy between the energy suppliers and the energy demanders, and updating the reinforcement learning model.

2. The method according to claim 1, wherein updating the reinforcement learning model comprises:
   calculating a reward of the determined price bids according to an adjustment made to the energy storage system; and
   collecting the at least one market index of the energy market in response to the price bids and integrating the at least one market index with the renewable-energy index and the electricity information of the energy storage system into the states, and adopting the states and the reward to update the reinforcement learning model.

3. The method according to claim 2, wherein the reinforcement learning model comprises a Deep Q-Network, and updating the reinforcement learning model comprises:
   adopting the price bids, the states, and the reward to calculate a loss function of the Deep Q-Network to update a plurality of network parameters of the Deep Q-Network.

4. The method according to claim 2, wherein calculating the reward of the determined price bids according to the adjustment of the energy storage system comprises:
   deducting a loss produced by adopting the price bids from an income obtained by adopting the price bids to obtain a profit to act as the reward.

5. The method according to claim 1, wherein collecting the historical power-generation data of each of the energy suppliers to generate the renewable-energy index representing uncertainty of the renewable energy comprises:
   constructing a feature matrix with the historical power-generation data;
   performing a clustering algorithm to divide a plurality of elements in the feature matrix into a plurality of groups; and
   calculating distances between a center of each of the groups and a zero point, so as to generate the renewable-energy index.

6. The method according to claim 5, wherein calculating the distances between the center of each of the groups and the zero point to generate the renewable-energy index comprises:
   counting a number of the energy suppliers that select the energy aggregator in each of the groups; and
   multiplying the number of each of the groups respectively by a corresponding weight, so as to generate the renewable-energy index.

7. The method according to claim 1, wherein collecting the at least one market index of the renewable-energy market comprises:
   determining whether a minimum value of the price bids for the energy demanders is greater than or equal to a maximum value of the price bids for the energy suppliers; and
   according to a determination result, determining a market rationality index to be one of the at least one market index.

8. The method according to claim 1, wherein collecting the at least one market index of the renewable-energy market comprises:
    determining whether a total supply amount of the renewable energy supplied by the energy suppliers is greater than a total demand amount of the renewable energy demanded by the energy demanders; and
    according to a determination result, determining a supply-demand balance index to be one of the at least one market index.

9. The method according to claim 1, wherein collecting the at least one market index of the renewable-energy market comprises:
    obtaining the price bids offered by a plurality of competing energy aggregators for the energy suppliers and the energy demanders to act as one of the at least one market index.

10. The method according to claim 1, wherein adjusting the energy storage system to coordinate the supply and demand of the renewable energy between the energy suppliers and the energy demanders comprises:
    determining whether a total supply amount of the renewable energy supplied by the energy suppliers is greater than or equal to a total demand amount of the renewable energy demanded by the energy demanders;
    when the total supply amount is greater than or equal to the total demand amount, selecting a minimum value among a difference between the total supply amount and the total demand amount and a difference between a maximum energy storage capacity and current electricity of the energy storage system, so as to determine the supply amount of the energy suppliers and the demand amount of the energy demanders; and
    when the total supply amount is less than the total demand amount, selecting a minimum value among a difference between the total demand amount and the total supply amount and a difference between current electricity and a minimum energy storage capacity of the energy storage system, so as to determine the supply amount of the energy suppliers and the demand amount of the energy demanders.

11. An apparatus for renewable-energy allocation based on reinforcement learning, the apparatus for renewable-energy allocation serving as an energy aggregator to coordinate supply-demand allocation of renewable energy between a plurality of energy suppliers and a plurality of energy demanders, the apparatus for renewable-energy allocation comprising:
    an energy storage system, configured to store the renewable energy;
    a connection device, configured to connect each of the energy suppliers and each of the energy demanders;
    a storage device, configured to store computer programs; and
    a processor, coupled to the energy storage system, the connection device, and the storage device, and configured to load and execute the computer programs to:
        collect historical power-generation data of each of the energy suppliers, so as to generate a renewable-energy index representing uncertainty of the renewable energy;
        collect at least one market index related to renewable-energy market dynamics and integrate the at least one market index with the renewable-energy index and electricity information of the energy storage system into a plurality of states of a Markov decision process;
        input the states to a reinforcement learning model, so as to determine a price bid for each of the energy suppliers and the energy demanders through computation of the reinforcement learning model; and
        according to a supply amount and a demand amount proposed by the energy suppliers and the energy demanders in response to the price bids, adjust the energy storage system and coordinate supply and demand of the renewable energy between the energy suppliers and the energy demanders, and update the reinforcement learning model.

12. The apparatus for renewable-energy allocation according to claim 11, wherein the processor is configured to:
    calculate a reward of the determined price bids according to an adjustment made to the energy storage system; and
    collect the at least one market index of the energy market in response to the price bids and integrate the at least one market index with the renewable-energy index and the electricity information of the energy storage system into the states, and adopt the states and the reward to update the reinforcement learning model.

13. The apparatus for renewable-energy allocation according to claim 12, wherein the reinforcement learning model comprises a Deep Q-Network, and the processor is configured to calculate a loss function of the Deep Q-Network using the price bids, the states, and the reward, so as to update a plurality of network parameters of the Deep Q-Network.

14. The apparatus for renewable-energy allocation according to claim 12, wherein the processor is configured to take a profit obtained by deducting a loss produced by adopting the price bids from an income obtained by adopting the price bids as the reward.

15. The apparatus for renewable-energy allocation according to claim 11, wherein the processor is configured to:
    construct a feature matrix with the historical power-generation data;
    perform a clustering algorithm to divide a plurality of elements in the feature matrix into a plurality of groups; and
    calculate distances between a center of each of the groups and a zero point, so as to generate the renewable-energy index.

16. The apparatus for renewable-energy allocation according to claim 15, wherein the processor is configured to:
    count a number of the energy suppliers that select the energy aggregator in each of the groups; and
    multiply the number of each of the groups respectively by a corresponding weight, so as to generate the renewable-energy index.

17. The apparatus for renewable-energy allocation according to claim 11, wherein the processor is configured to:
    determine whether a minimum value of the price bids for the energy demanders is greater than or equal to a maximum value of the price bids for the energy suppliers; and
    according to a determination result, determine a market rationality index to be one of the at least one market index.

18. The apparatus for renewable-energy allocation according to claim 11, wherein the processor is configured to:
 determine whether a total supply amount of the renewable energy supplied by the energy suppliers is greater than a total demand amount of the renewable energy demanded by the energy demanders; and
 according to a determination result, determine a supply-demand balance index to be one of the at least one market index.

19. The apparatus for renewable-energy allocation according to claim 11, wherein the processor is configured to obtain the price bids offered by a plurality of competing energy aggregators for the energy suppliers and the energy demanders to act as one of the at least one market index.

20. The apparatus for renewable-energy allocation according to claim 11, wherein the processor is configured to:
 determine whether a total supply amount of the renewable energy supplied by the energy suppliers is greater than or equal to a total demand amount of the renewable energy demanded by the energy demanders;
 when the total supply amount is greater than or equal to the total demand amount, select a minimum value among a difference between the total supply amount and the total demand amount and a difference between a maximum energy storage capacity and current electricity of the energy storage system, so as to determine the supply amount of the energy suppliers and the demand amount of the energy demanders; and
 when the total supply amount is less than the total demand amount, select a minimum value among a difference between the total demand amount and the total supply amount and a difference between current electricity and a minimum energy storage capacity of the energy storage system, so as to determine the supply amount of the energy suppliers and the demand amount of the energy demanders.

\* \* \* \* \*